United States Patent
Sheppard

[11] 3,845,834
[45] Nov. 5, 1974

[54] MOTOR CYCLE CONSTRUCTION
[76] Inventor: Francis Ernest Sheppard, Milton Gardens, Oadby, England
[22] Filed: Sept. 15, 1971
[21] Appl. No.: 180,766

[30] Foreign Application Priority Data
Sept. 17, 1970 Great Britain .................. 44371/70

[52] U.S. Cl. ............. 180/33 A, 180/33 B, 280/5 H, 280/283, 180/54 A
[51] Int. Cl. ...................... B62d 61/02, B60k 11/00
[58] Field of Search ........ 180/33 R, 33 A, 33 B, 35, 180/32, 54 A; 280/5 A, 5 H

[56] References Cited
UNITED STATES PATENTS

| | | | |
|---|---|---|---|
| 1,259,989 | 3/1918 | Hult | 180/33 R |
| 1,266,589 | 5/1918 | Harley | 180/33 A |
| 1,412,634 | 4/1922 | Schreiber | 180/33 B |
| 1,461,869 | 7/1923 | Franzenburg | 180/33 R |
| 1,967,415 | 7/1934 | Lesage | 180/33 A |
| 2,500,659 | 3/1950 | Burwell | 180/32 X |
| 3,517,764 | 6/1970 | Wendt | 180/33 R |

FOREIGN PATENTS OR APPLICATIONS

| | | | |
|---|---|---|---|
| 555,616 | 7/1923 | France | 180/33 R |
| 653,450 | 5/1951 | Great Britain | 180/33 B |
| 525,310 | 1/1954 | Belgium | 180/33 R |
| 1,083,063 | 1/1955 | France | 180/33 A |
| 714,888 | 11/1941 | Germany | 180/35 |

Primary Examiner—David Schonberg
Assistant Examiner—John P. Silverstrim

[57] ABSTRACT

The motor cycle has an opposed cylinder engine mounted on its frame with the engine cylinders extending along the frame at a substantial angle to the horizontal and with the rear cylinder at a higher level than the front cylinder. Advantageously the engine is mounted so that the crank shaft and gear box are positioned with the output shaft from the gear box adjacent to a suspension pivot for the driven wheel.

3 Claims, 2 Drawing Figures

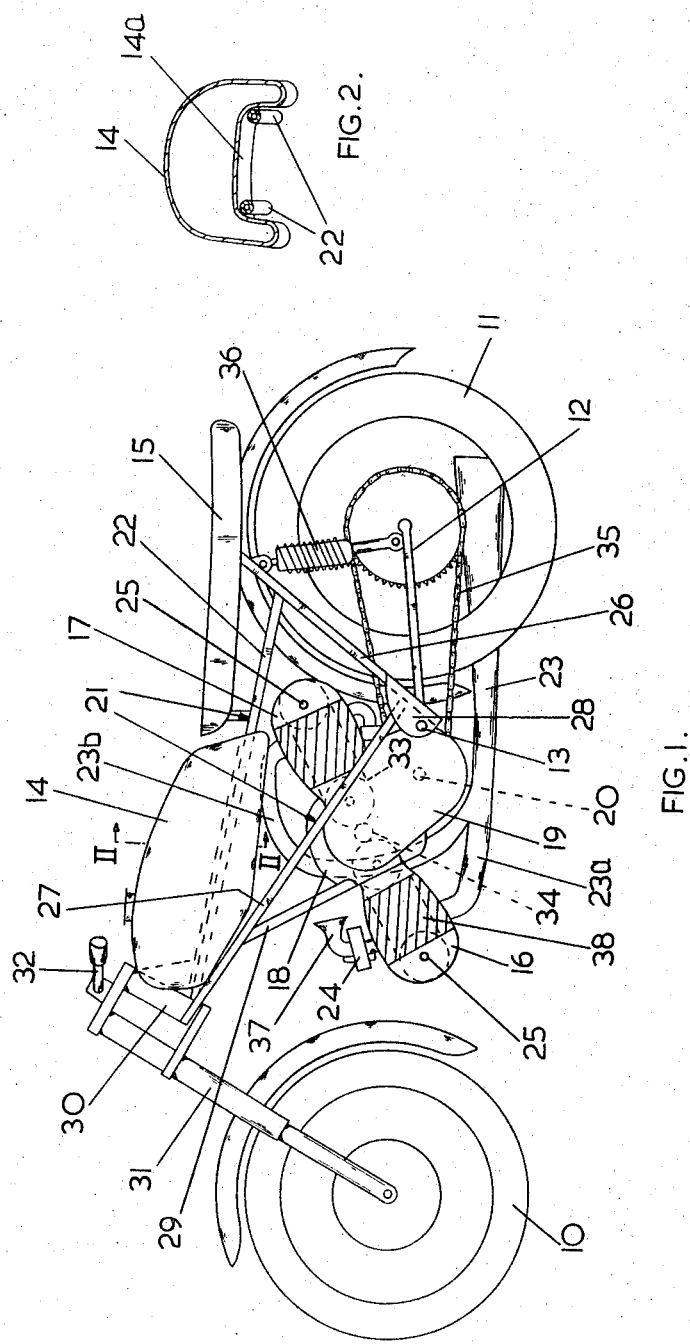

MOTOR CYCLE CONSTRUCTION

This invention concerns a motor cycle construction and more particularly an improved mounting arrangement for the engine thereof. It seeks to provide an arrangement offering certain advantages in the accomodation and effectiveness of operation of an engine of a particular type on a motor cycle.

The most suitable four-stroke engine for a motor cycle is considered to be an engine of opposed cylinder type, i.e., an engine having one or more pairs of cylinders with those in each pair arranged oppositely end to end with the crank shaft between them. There are difficulties in accomodating such an engine effectively in a motor cycle frame. If it is arranged in the conventional longitudinal attitude with the cylinder axis horizontal the rear cylinder is shielded from the air currents and tends to become over-heated; moreover it is difficult to find a satisfactory position for the gear box. On the other hand if the cylinder is arranged horizontally across the vehicle there is a risk of damaging the cylinder heads and valve gears due to their projection from the frame. Other considerations need also to be taken into account such as the reaction forces created on the frame by the engine when it is running. Badly directed reaction forces can create difficulties in handling the motor cycle. Further the engine position must be suitable for effective transmission of power from engine to the driven wheel.

In accordance with the invention there is provided, in a motor cycle, an opposed cylinder engine mounted on the frame of the motor cycle with the engine cylinders extending along the frame at a substantial angle to the horizontal and with the rear cylinder at a higher level than the front cylinder. This will cause the rear cylinder to be positioned at an inclination to the air flow so that it is exposed thereto instead of being shielded from it by other parts of the engine. The engine is also conveniently mounted so that the crank shaft and gear box are positioned with the output from the gear box positioned adjacent to a suspension pivot for the driven wheel. By this form of construction an efficient engine mounting is secured which offers substantial freedom from unbalanced reaction forces on the motor cycle frame and adequate air cooling of both forward and rearward cylinders and which avoids objectionable torque reaction on the vehicle frame. This form of construction enables a motor cycle to be provided with a relatively light weight frame and adequate engine cooling in a construction which is easy to control and handle when in use.

The engine is as usual mounted at a level below that of the fuel tank so that air flow passing below the latter during travel of the vehicle tends to be directed on to the cooling fins of both of the engine cylinders. If desired the under part of the fuel tank may be so shaped as to deflect air flow on to the cooling fins of the rear cylinder.

By way of example a diagrammatic showing of an arrangement according to the invention is illustrated in the accompanying drawing in which FIG. 1 shows relevant parts of a motor cycle in side elevation, and FIG. 2 is a detail view in cross-section taken on line II—II of FIG. 1.

The machine illustrated diagrammatically has front and rear wheels 10 and 11, the rear wheel 11 being carried on a sprung sub frame 12 pivoted to the main frame at 13. There is a horizontal fuel tank indicated at 14 and a drivers saddle at 15. The engine has cylinders 16 and 17 which are arranged end to end projecting from a crank case 18 and a gear box 19 the output shaft 20 from which is positioned close to the pivot 13 of the frame 12. The main frame of the motor cycle is indicated generally by the reference 21. The cylinders 16 and 17 may be mounted with their axes inclined at an angle of about 30° or 45° to the horizontal. By adoption of an engine of a type in which the pistons have a short stroke the overall length of the engine can be kept relatively short.

The frame construction shown comprises laterally spaced top members 22 connected to laterally spaced upstanding rear members 26 forming a triangular structure with laterally spaced forwardly extending members 27. The members 26 and 27 are strengthened at their junctions at each side by gusset plates 28. The engine, chain and gear box casings are fixed to one another and mounted on the frame as a unit by attachment of the gear box casing 19 to the gusset plates 28 by means of a single bracing member 29 connecting the engine to the forwardly converging frame parts 27. The forward ends of the frame parts 22 and 27 are together attached to a steering head 30 on which the orthodox assembly of the telescoping front forks 31 and the handle bars 32 can turn bodily for steering.

The fuel tank 14 is recessed at its under part 14a as shown in FIG. 2 and straddles the spaced upper frame parts 22 forwardly of the saddle 15. Advantageously the recessed under part 14a of the tank is slanted downwardly and rearwardly as shown (with the slant of the frame members 22) so as to deflect cooling air onto the fins of the upper cylinder 17.

The engine exhaust pipes are indicated at 23a and 23b leading to a main exhaust outlet pipe 23. The carburettors for the two engine cylinders are indicated diagrammatically at 24 and have air inlets 37. The cylinders have "overhead" cam shafts 25 shown as driven by rubber belts 33 from shafts geared to the main crank shaft 34.

The rear wheel 11 of the vehicle is driven by a chain belt 35 from the output shaft 20 of the gear box which is on the far side of the casing 19 as seen in FIG. 1. The two parallel frame parts 12 pivoted at 13 and carrying the rear wheel 11 between them are sprung for resilient pivoted movement by telescoping compression spring links 36.

It will be seen from FIG. 1 that the engine cylinders 16 and 17 (which may be identical in construction) are provided with cooling fins 38 arranged slantwise of the cylinders in such manner as to lie in approximately horizontal planes in the mounted position of the engine.

By reason of the position of the engine as shown the forward and rearward reaction forces of the cylinders 16 and 17 are sufficiently balanced to enable the engine to be mounted on a light weight frame and both cylinders to be effectively cooled. The engine mounting is also such that there are substantially no out of balance forces set up in the frame and the torque reaction caused by rotation of the crank shaft does not give rise to any difficulty in handling the machine.

What I claim is:

1. In a motor cycle, the combination comprising a frame having laterally spaced frame members including laterally spaced and downwardly and rearwardly sloped upper longitudinal frame members and laterally spaced lower frame members sloped at a steeper angle than said upper longitudinal frame members and joined forwardly to the forward ends thereof, a saddle mounting at the upper rear part of the said frame, a fuel tank mounted on said laterally spaced upper frame members forwardly of said saddle mounting and having an upwardly recessed bottom wall straddling said upper frame members to present around them a downwardly and rearwardly sloped inverted channel shaped air deflecting duct, an air cooled opposed cylinder internal combustion engine mounted between parts of said frame below and forwardly of said saddle mounting, said engine having its cylinders extending lengthwise of the frame and at a substantial angle to the horizontal with the rear cylinder at a higher level than the front cylinder and at a position lower than and adjacent to the rearward end of said air deflecting duct whereby to receive therefrom a stream of cooling air during forward motion of the motor cycle, and with the front cylinder projecting downwardly and forwardly beyond the said sloped lower frame members.

2. A combination as claimed in claim 1 wherein the said frame comprises laterally spaced upstanding rear frame members connecting the rear ends of said lower frame members to the rear ends of said upper longitudinal frame members, gusset plates one at each side of the frame, fixed across the rear ends of said lower frame members and the lower end parts of said upstanding rear frame members, a single bracing member fixed to depend from converging forward parts of said lower frame members, and means anchoring the engine to the frame at three points, namely one on each of the gusset plates and the third at the lower part of said bracing member.

3. A combination as claimed in claim 2, comprising a gear box connected to the said engine and forming therewith an engine unit and means connecting said engine unit to the said gusset plates and bracing member with the engine unit positioned to extend through the space between the said laterally spaced lower frame members at a position behind the bracing member.

* * * * *